United States Patent [19]

Smolik

[11] 4,403,708
[45] Sep. 13, 1983

[54] ELECTRICAL RECEPTACLE BOX ASSEMBLY

[76] Inventor: Robert A. Smolik, 670 W. Seventh St., St. Paul, Minn. 55102

[21] Appl. No.: 399,473

[22] Filed: Jul. 19, 1982

[51] Int. Cl.³ .............................................. H02G 3/10
[52] U.S. Cl. ...................................... 220/3.5; 174/58; 220/3.3; 220/3.9; 248/DIG. 6
[58] Field of Search ................................ 220/3.2–3.94; 248/27, 1, DIG. 6; 33/174 G, DIG. 10; 174/52 R, 53, 57, 58; 24/291, 295, 296, 336, 208 R

[56] References Cited

U.S. PATENT DOCUMENTS

| | | | |
|---|---|---|---|
| 1,660,665 | 2/1928 | Aleksandrowitz | 24/208 R |
| 1,800,173 | 4/1931 | Anderson | 220/307 |
| 2,016,284 | 10/1935 | Knight | 247/25 |
| 2,265,957 | 12/1941 | Tinnerman | 24/295 |
| 2,361,506 | 10/1944 | Smith | 24/208 A |
| 2,562,344 | 7/1951 | Tranas | 220/3.6 |
| 2,567,309 | 9/1951 | Adair et al. | 220/18 |
| 2,627,359 | 2/1953 | Woodward | 220/18 X |
| 2,721,245 | 10/1955 | Arisman et al. | 24/208 R |
| 2,759,621 | 8/1956 | Hamilton et al. | 220/3.6 |
| 2,871,324 | 1/1959 | Budd | 220/18 X |
| 2,878,955 | 3/1959 | Hagan | 220/18 X |
| 3,376,005 | 4/1968 | Swanquist | 220/3.9 X |
| 4,229,614 | 10/1980 | Smolik | 174/58 |

FOREIGN PATENT DOCUMENTS 1243920 7/1967 Fed. Rep. of Germany ........ 24/295

OTHER PUBLICATIONS

1981 Caddy Fasteners Catalog.

Primary Examiner—William Price
Assistant Examiner—Gary E. Elkins
Attorney, Agent, or Firm—Burd, Bartz, & Gutenkauf

[57] ABSTRACT

An electrical receptacle box particularly adapted for mounting to a metal wall stud prepared with a plurality of holes on the major side thereof arranged in ordered patterns at preferred installation locations of receptacle boxes. The electrical receptacle box includes a housing with a front opening and an interior volume for housing an electrical receptacle. A plurality of resilient tines are fixed in parallel relationship at one end to a side wall of the box housing and extend perpendicularly away from the side wall. The tines are arranged to describe a pattern generally corresponding to the hole pattern on the wall stud but can be slightly deviant from the pattern such that the tines fit in the holes of a selected hole pattern deflected under slight spring tension. The tines can have notches to engage the edges of the holes.

21 Claims, 5 Drawing Figures

U.S. Patent  Sep. 13, 1983  4,403,708
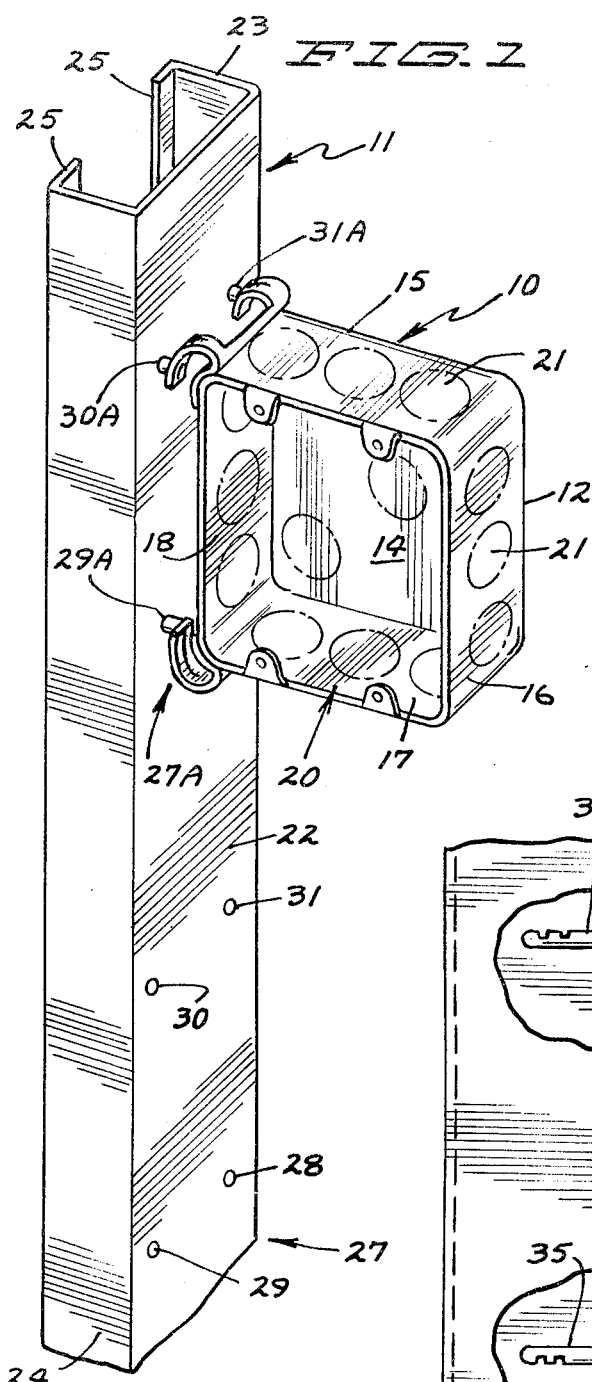
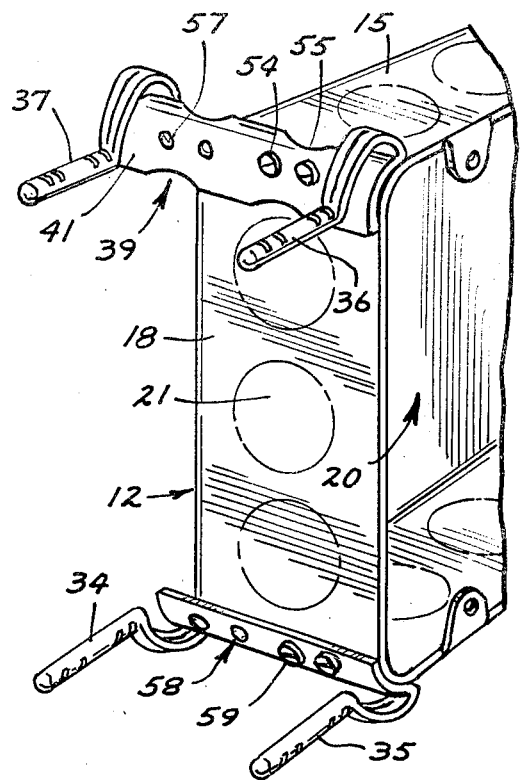
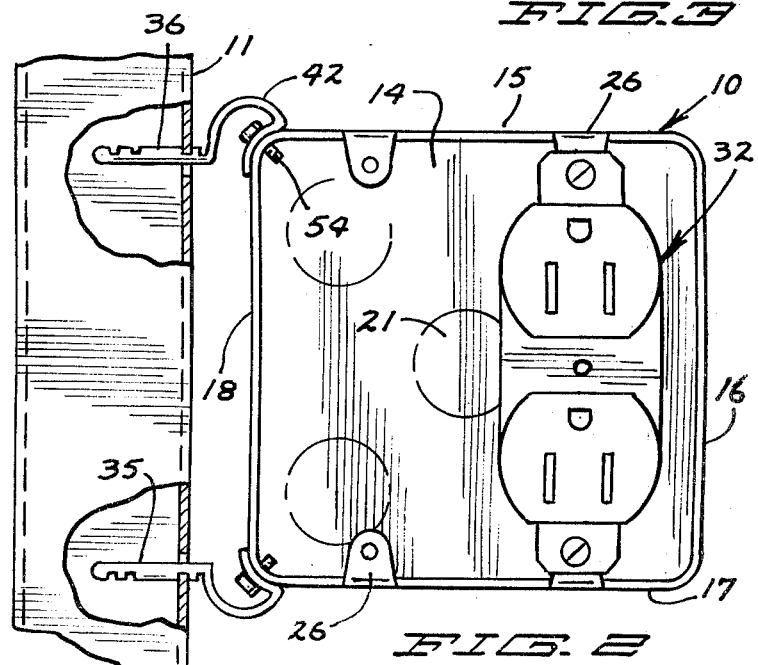
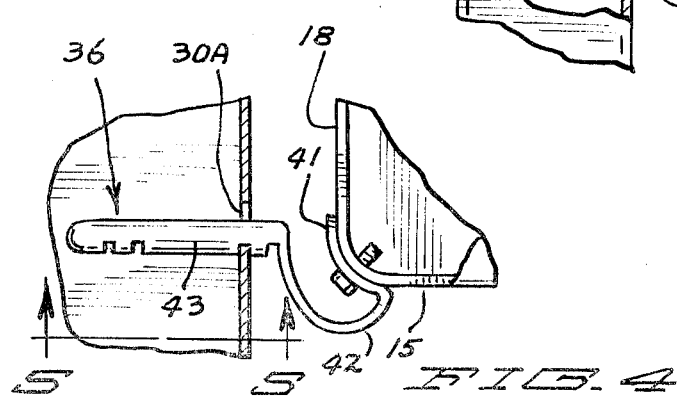
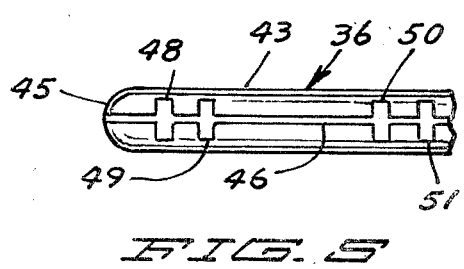

ELECTRICAL RECEPTACLE BOX ASSEMBLY

BACKGROUND OF THE INVENTION

The invention relates to the field of electrical receptacle boxes of the type mounted on a wall stud to hold an electrical receptacle such as an outlet or a switch or the like. In particular, the invention relates to such a receptacle box for mounting on a metal wall stud.

Metal wall studs find increasing use in commercial and residential construction because of superior durability and longevity characterstics. However, mounting electrical receptacle boxes to them presents special problems because they are not as readily penetrable as wood by usual fasteners. For purposes of economy, especially when constructing a commercial building, it is desirable to mount the receptacle box to the wall stud as efficiently as is practical. In the prior art, clips are used which have a clamp portion which is forcefully fitted to an edge of the box. Another portion of the clip is fastened to the front of the metal stud either by another spring clamp or by a screw. In either case, this portion is covered by wall board and presents a bulge that must be considered. Such installation is time consuming and does not mount the receptacle box in as sturdy a fashion as desirable.

SUMMARY OF THE INVENTION

The present invention comprises an electrical receptacle box particularly adapted for mounting to a metal wall stud. A metal wall stud intended for installation in a generally upright orientation in building construction is prepared with a plurality of holes on the major side thereof arranged in ordered patterns located at designated heights on the wall stud according to preferred installation locations of receptacle boxes. The electrical receptacle box includes a back wall and side walls defining a front opening and an interior volume for housing an electrical receptacle to be accessible at the front opening. A plurality of resilient prongs or tines are fixed in parallel relationship at one end to a side wall of the box housing and extend perpendicularly away from the side wall. The tines are arranged to describe a pattern generally corresponding to the hole pattern on the wall stud but can be slightly deviant from the pattern such that the tines fit in the holes of a selected hole pattern deflected under slight spring tension. The spring tension holds the tines with respect to the holes to hold the box housing in the desired position. The tines can have notches to engage the edges of the holes.

IN THE DRAWINGS

FIG. 1 is a perspective view of an electrical receptacle box according to the invention installed on a metal wall stud;

FIG. 2 is an enlarged front elevational view of the receptacle box of FIG. 1 installed on a wall stud with portions removed for purposes of illustration;

FIG. 3 is a perspective view of a portion of the electrical receptacle box of FIG. 1 removed from the wall stud for purposes of illustration;

FIG. 4 is an enlarged view of a corner portion of the electrical receptacle box shown in FIG. 2; and FIG. 5 is an enlarged view of a tine of FIG. 4 taken along the line 5—5 thereof.

DESCRIPTION OF PREFERRED EMBODIMENT

Referring to the drawings, there is shown in FIGS. 1 and 2 an electrical receptacle box according to the invention indicated generally at 10 mounted on a metal wall stud 11 of the type used in building construction. Electrical receptacle box 10 includes a housing 12 formed of a back wall 14 and perpendicularly orientated side walls 15, 16, 17 and 18 defining a front opening 20 and an interior volume for accommodation of an electrical receptacle such as a switch, outlet or the like that can be mounted on bosses 26 as electrical pocket 32 shown in phantom in FIG. 2. The rear wall and side walls have a plurality of conventional knock out members 21 for access to the interior of housing 12 from the sides and back for wiring, conduit or the like.

Wall stud 11 has a major side member 22 and perpendicular end members 23, 24 as well as inwardly turned flanges 25. The major side member 22 of wall stud 11 is prepared with a plurality of uniform sets of mounting holes describing hole patterns located at spaced intervals on wall stud 11 for mounting housing 12. A pattern of holes 27 is shown to include first, second, third and fourth holes 28-31 describing a rectangular configuration. Patterns 27 of holes can be longitudinally arranged at specific elevations on stud 11. A lower set of holes can be positioned at an elevation to mount a receptacle box to house a standard wall plug. Intermediate sets of holes can be positioned at an elevation to mount a counter height wall plug receptacle and at an elevation to mount a standard light switch receptacle box. Other sets of holes can be vertically spaced to be positioned at standard elevations to mount other receptacle boxes. Alternatively, mounting holes can be positioned continuously along the major side member 22 of wall stud 11 at regular intervals for practically universal mounting of the electrical receptacle box.

A plurality of parallel resilient prongs or tines are fastened to housing 12 and extend therefrom in spaced relationship generally describing the configuration of the hole patterns on stud 11. Tines 34 through 37 are fixed to housing 12 and extend away in perpendicular relationship to side wall 18 and in a horizontal direction when receptacle box 10 is in an upright orientation in preparation for mounting on a wall stud. Tines 34-37 are arranged in a rectangular pattern corresponding to the hole pattern 27 wherein tines 34-37 are insertable in holes 28-31 to mount box 10 on wall stud 11. The pattern formed by the tips of tines 34-37 corresponds generally to the pattern 27 of holes 28-31 but can deviate slightly from it whereby the tines 34-37 are deflected slightly in order to insert them into the holes and thus seat in the holes under a slight spring tension. For example, the rectangular pattern formed by the tines 34-37 can be slightly larger than the pattern formed by the holes 28-31. The tines are resiliently deflected inward in order to fit them into the holes and are accordingly under a slight spring tension to assist in maintaining them seated in the holes.

Upper tines 36, 37 are part of a bracket 39 installed on the corner of housing 12 formed at the intersection of side walls 15, 18. Bracket 39 has an elongate base 41 with an inside surface conformed to fit the contour of the corner at the intersection of the side walls. One end of base 41 is flush with front opening 20 of housing 12. The other end extends beyond rear wall 14 to permit symmetrical mounting on stud 11.

Tines 36, 37 are formed at the lateral ends of base 41. As shown in FIG. 4, tine 36 extends from the distal edge of base 41 and has a reverse curve bending around over base 41 forming a spring loop 42 which extends to a straight or linear tine section 43. Spring loop 42 permits resilient movement of the straight section 43 of tine 36. Tine 36 is formed from a flat section of metal extended from base 41 bent around to form spring loop 42 and rolled together to form tubular linear tine section 43 and the outer portion of spring loop 42. As shown in FIG. 6, the tip 45 of linear tine section 43 is rounded to facilitate insertion into a mounting hole. As a result of the rolling procedure an elongate slot 46 is formed extending the length of tine section 43. Slot 43 permits limited compression of the diameter of tine section 43.

Referring again to FIG. 6, linear section 43 of tine 36 has a plurality of transverse notches located on the periphery thereof for engagement of the edge of a mounting hole. An outer pair of notches 48, 49 is located toward the tip 45 of tine 36, and a second or inner pair of notches 50, 51 is located further rearward. As shown in FIG. 4, the notch 50 is engaged with the edge of a mounting hole 30A with tine 36 installed therein. This secures installation of the tine with respect to the mounting hole. Tine 36 can be in slight spring tension as earlier described to bias notch 50 in engagement with the edge of hole 30A. Forward notches 48, 49 are used when the receptacle box 10 is to be mounted in relatively spaced relationship from wall stud 11. The inward notches 50, 51 are used when the receptacle box 10 is to be mounted in relatively closer relationship to the wall stud 11. The notches face outwardly of the hole pattern. The remaining tines 34, 35, 37 are constructed in identical fashion to the tine 36 and have like forward and rearward notches. The purpose of pairs of notches is to permit angular adjustment of the housing 12 upon installation on wall stud 11 in the event the wall stud 11 should be slightly askew. For example, the tine can be installed in mounting holes with the edges of the holes engaging notch 50 and the corresponding notches on the other tines. Should the wall stud be slightly askew, one or more of the tines can be adjusted whereby the hole edge engages the rearward notch 51 of the pair to compensate and angularly orientate the front opening 20 of the housing 12 so that it will be flush with side member 24 of wall stud 11 for subsequent installation of wall board.

As shown in FIG. 3, mounting screws 54 passing through suitable openings in the base 41 (not shown) mount the bracket 39 to the housing 12. Other mounting means could be provided such as rivets, welding or the like. Arcuate cut outs 55 are provided in base 41 to permit access to the adjacent knock out members 21. Second screw holes 57 are provided on base 41 in symmetrical relationship to the holes accommodating screws 54 to that bracket 39 may be used on other corners of housing 12. Mounting holes 28-31 are symmetrically disposed on the surface of side member 22 so that box 10 can be mounted with front opening 20 facing in either direction.

Lower bracket 58 carrying the lower tines 34, 35 is constructed in identical fashion to the upper bracket 39 and is fastened to the corner of housing 12 located at the intersection of side walls 17, 18 by suitable screws 59.

In use and in terms of a method, tines 34-37 are provided on receptacle box 10 defining a pattern slightly larger than the hole pattern 27A defined by holes 29A-31A provided on an intended installation site on wall stud 11. The tine ends are given a slight spring deflection and the tines are inserted in the corresponding mounting holes to an extent where a forward notch of one of the pairs of notches engages the hole edge.

The receptacle box 10 is then securely installed with respect to wall stud 11 as shown in FIGS. 1 and 2, and an electrical receptacle can now be installed thereon. If the wall stud 11 is slightly askew, or is slightly inclined, or is thicker at one end than the other, the positioning of the box is adjusted through the use of the rear notch of the notch pairs at one or more tines. The tines are held in the respective mounting holes under a slight spring tension.

While there has been shown and described a preferred embodiment of the invention, it will be apparent that deviations and changes can be had from the embodiment shown without departing from the scope and spirit of the invention.

The embodiments of the invention in which an exclusive property or privilege is claimed are defined as follows:

1. An electrical receptacle box assembly comprising:
    a box-like housing for accommodation of an electrical receptacle;
    a metal wall stud of the type for use in building construction with a major side member having a plurality of mounting holes describing a hole pattern;
    a plurality of resilient tines mounted on the exterior of the housing, each having a linear tine portion outwardly extended from the housing, said linear tine portions being substantially parallel to each other, each tine at an opposite end having a spring loop portion fixed to the housing permitting resilient deflection of the linear tine portion with respect to the housing;
    the outer ends of the linear tine portions of said tines being arranged to describe a pattern generally corresponding to, but slightly deviant from, the hole pattern on the wall stud whereby the tines are insertable into corresponding holes under slight spring deflection to mount the housing with respect to the wall stud; and
    each linear tine portion having at least one transverse notch positioned for engagement with the edge of a mounting hole upon insertion of the tines into the mounting holes.

2. The receptacle box assembly of claim 1 wherein:
    said metal wall stud has a plurality of spaced apart hole patterns.

3. The receptacle box assembly of claims 1 or 2 wherein:
    said mounting holes describe a rectangular pattern of four mounting holes, said tines describing a rectangular pattern comprised of four tines.

4. The receptacle box assembly of claim 3 wherein:
    the rectangular pattern described by the tines is slightly larger than the pattern described by the mounting holes whereby the tines are insertable in the mounting holes under slight spring tension.

5. The receptacle box assembly of claim 4 wherein:
    said tines have pairs of transverse notches for engagement with edges of the mounting holes.

6. The receptacle box assembly of claims 1 or 2 wherein:
    said tines have pairs of transverse notches for engagement with edges of the mounting holes.

7. The receptacle box assembly of claim 1 wherein:
    said housing having a back wall and perpendicularly orientated side walls connected to the back wall at one edge and defining a front opening at the other edge, and including a first bracket fixed to the housing and carrying a portion of said plurality of tines, and a second bracket fixed to the housing and carrying the remainder of said plurality of tines.

8. The receptacle box assembly of claim 7 wherein: said mounting holes describe a rectangular pattern of four mounting holes, said tines describing a rectangular pattern comprised of four tines, a first and second of said tines being located on the first bracket and a third and fourth of said tines being located on the second bracket.

9. The receptacle box assembly of claim 8 wherein: the rectangular pattern described by the tines is slightly larger than the pattern described by the mounting holes whereby the tines are insertable into the mounting holes under slight spring tension.

10. The receptacle box assembly of claim 9 wherein: said tines have pairs of transverse notches for engagement with edges of the mounting holes.

11. The receptacle box assembly of claim 8 wherein: said first bracket is mounted on a first corner of the housing formed at the intersection of a first side wall and a first adjacent side wall, said first bracket including a base having a surface conforming to the shape of the first corner, means fastening the base to the first corner, said first and second tines extending from lateral ends of the base in generally perpendicular relationship to the first side wall; and said second bracket being mounted on a second corner of the housing formed at the intersection of the first side wall and a second adjacent side wall, said second bracket including a second base having a surface conforming to the shape of the second corner, means fixing the second base to the second corner, said third and fourth tines extending from lateral ends of the second base in generally perpendicular relationship to the first side wall.

12. The receptable box assembly of claim 11 wherein: the rectangular pattern described by the tines is slightly larger than the pattern described by the mounting holes whereby the tines are insertable in the holes under slight spring tension.

13. The receptable box assembly of claim 12 wherein: said metal wall stud has a plurality of spaced apart hole patterns, the holes of each pattern being symmetrically disposed on the stud member.

14. The receptacle box assembly of claim 11 wherein: the first and second tines are each connected at one end to an edge of the base of the first bracket and have a reverse curve portion extending over the base and forming said spring loop, and said linear tine section extending from the spring loop; and the third and fourth tines are each connected at one end to an edge of the base of the second bracket and have a reverse curve portion extending over the base and forming a spring loop, and a linear tine section extending from the spring loop.

15. The receptacle box assembly of claim 14 wherein the first and second brackets each have one end flush with the front opening of the housing and an opposite end extended beyond the rear wall of the housing.

16. The receptacle box assembly of claim 14 wherein: said tines have pairs of transverse notches for engagement with edges of the mounting holes.

17. The receptacle box assembly of claim 14 wherein: each tine has a first outward pair of transverse notches located near the outer tip of the linear tine section and a second inward pair of transverse notches located toward the spring loop portion of the tine.

18. The receptacle box assembly of claims 16 or 17 wherein: the rectangular pattern described by the tines is slightly larger than the pattern described by the mounting holes whereby the tines are insertable in the holes under slight spring tension.

19. The receptable box assembly of claim 18 wherein: said metal wall stud has a plurality of spaced apart hole patterns.

20. The receptacle box assembly of claim 19 wherein: the notches face outwardly from the hole pattern.

21. A method of installing an electrical receptacle box to a wall stud comprising:
providing metal wall stud according to claim 1;
providing a housing having a plurality of tines according to claim 1; and
inserting the tines in the mounting holes to mount the housing to the wall stud.

* * * * *

UNITED STATES PATENT AND TRADEMARK OFFICE
CERTIFICATE OF CORRECTION

PATENT NO. : 4,403,708
DATED : September 13, 1983
INVENTOR(S) : Robert A. Smolik It is certified that error appears in the above-identified patent and that said Letters Patent is hereby corrected as shown below:

Column 2, line 8, "pocket" should be -- socket --.

Column 2, line 9, delete "phantom in".

Column 3, line 6, "Figure 6" should be -- Figure 5 --.

Column 3, line 10, "43" second occurrence should be -- 46 --.

Column 3, line 12, "Figure 6" should be -- Figure 5 --.

Column 6, line 10, delete "a" each occurrence and insert -- said --.

Column 6, line 39, following "providing", insert -- a --.

Signed and Sealed this

Thirtieth Day of April 1985

[SEAL]

Attest:

DONALD J. QUIGG

Attesting Officer     Acting Commissioner of Patents and Trademarks